(12) United States Patent
Wickramasuriya et al.

(10) Patent No.: US 12,393,630 B2
(45) Date of Patent: Aug. 19, 2025

(54) SYSTEM AND METHOD FOR REDUCING RESOURCES USED FOR UPLOADING A VIDEO TO BE INDEXED FOR SEARCHING

(71) Applicant: MOTOROLA SOLUTIONS, INC., Chicago, IL (US)

(72) Inventors: Jehan Wickramasuriya, Hopkinston, MA (US); Trent J Miller, West Chicago, IL (US); Boris Ploix, Cambridge, MA (US); Andrey Vorobiev, Stuer (DK)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 18/365,497

(22) Filed: Aug. 4, 2023

(65) Prior Publication Data

US 2025/0045328 A1 Feb. 6, 2025

(51) Int. Cl.
 *G06F 16/70* (2019.01)
 *G06F 16/75* (2019.01)

(52) U.S. Cl.
 CPC .................................. *G06F 16/75* (2019.01)

(58) Field of Classification Search
 CPC ...................................................... G06F 16/75
 USPC ................ 707/737, 741, 738, 736, 913, 914
 See application file for complete search history.

(56) References Cited

U.S. PATENT DOCUMENTS

| | | | |
|---|---|---|---|
| 8,687,941 B2 | 4/2014 | Dirik et al. | |
| 9,818,451 B1 | 11/2017 | Tyagi et al. | |
| 10,679,063 B2 * | 6/2020 | Cheng | G11B 27/10 |
| 10,769,913 B2 * | 9/2020 | Wang | H04N 7/181 |
| 11,463,739 B2 * | 10/2022 | Larrew | H04N 21/23418 |
| 2013/0166711 A1 * | 6/2013 | Wang | G08B 13/19656 709/223 |
| 2014/0328570 A1 * | 11/2014 | Cheng | G06F 16/43 386/241 |
| 2017/0046574 A1 * | 2/2017 | Laska | G06F 3/04842 |
| 2017/0078767 A1 * | 3/2017 | Borel | G11B 27/031 |

(Continued)

FOREIGN PATENT DOCUMENTS

| | | | |
|---|---|---|---|
| EP | 2795600 | * | 10/2014 |
| EP | 2795600 A1 | * | 10/2014 |

OTHER PUBLICATIONS

The International Search Report and the Written Opinion, corresponding patent application No. PCT/US2024/038167 filed: Jul. 16, 2024, mailed Oct. 25, 2024, all pages.

*Primary Examiner* — Daniel A Kuddus

(57) ABSTRACT

Techniques for reducing resources used for uploading a video to be indexed for searching at a cloud search service are provided. A file containing the video is received at an on premise client application. The application processes the file with an event detector to detect at least one event of interest based on a first set of event detection criteria. The at least one event of interest is sent to the cloud searching service. The cloud searching service classifies at least one object in the at least one event of interest. The cloud searching service identifies a second set of event identification criteria based on the classification. The cloud searching service sends feedback to the application for event detection and sending events based on the second set of event identifying criteria. The application modifies the first event detection criteria based on the feedback to create new event detection criteria.

20 Claims, 5 Drawing Sheets

(56) References Cited

U.S. PATENT DOCUMENTS

| | | | |
|---|---|---|---|
| 2019/0213420 A1 | 7/2019 | Karyodisa et al. | |
| 2021/0067743 A1* | 3/2021 | Hodge | H04N 21/2347 |
| 2021/0084350 A1* | 3/2021 | Chandra | H04N 21/26258 |
| 2021/0141935 A1* | 5/2021 | Irvin | G06V 30/1983 |
| 2021/0209248 A1* | 7/2021 | Feuz | G06N 3/045 |
| 2021/0212168 A1* | 7/2021 | Yoden | H04W 88/06 |
| 2021/0409790 A1* | 12/2021 | Larrew | H04N 21/23103 |
| 2022/0294971 A1 | 9/2022 | Dahlgren et al. | |
| 2022/0318325 A1* | 10/2022 | Boyd | G06F 18/40 |

* cited by examiner

SYSTEM AND METHOD FOR REDUCING RESOURCES USED FOR UPLOADING A VIDEO TO BE INDEXED FOR SEARCHING

BACKGROUND

One common system architecture for deploying video security systems is to install cameras whose field of views cover an area of interest. In some implementations, these cameras may stream video to a cloud based video analytics system. For example, the video analytics system may run in a public compute cloud (e.g. Amazon Web Services™, Azure™, etc.) or in a private compute cloud (e.g. provided by the operator of the video analytics system). In some implementations, the cameras may be connected to a local Video Management System (VMS) for local storage of captured video and the video is streamed from the VMS to the cloud based video analytics system.

The cloud based video analytics system may then perform any number of video analytics on the incoming video streams. Some examples of the type of analytics that can be performed include motion detection, object detection, object recognition, facial recognition, facet recognition, weapons detection, and any other type of currently available or later developed video analytic. The results of these analytics may then be indexed and stored in a database for later searching. For example, a motion detector may identify a moving object in a video. An object identifier may determine the moving object is a human. Facet recognition may be used to determine the person is wearing a red shirt and blue pants. This information may be stored in a database. At a later time, a search may be performed for person in a red shirt wearing blue pants. The database could be searched and indicate that the video includes the object being searched for.

Video analytics can be compute processing power intensive. By executing the video analytics in the cloud computing environment, it is possible to avoid including such processing resources in either the cameras or the VMS. The result being that the cameras and VMS systems themselves may be cheaper to purchase and maintain.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
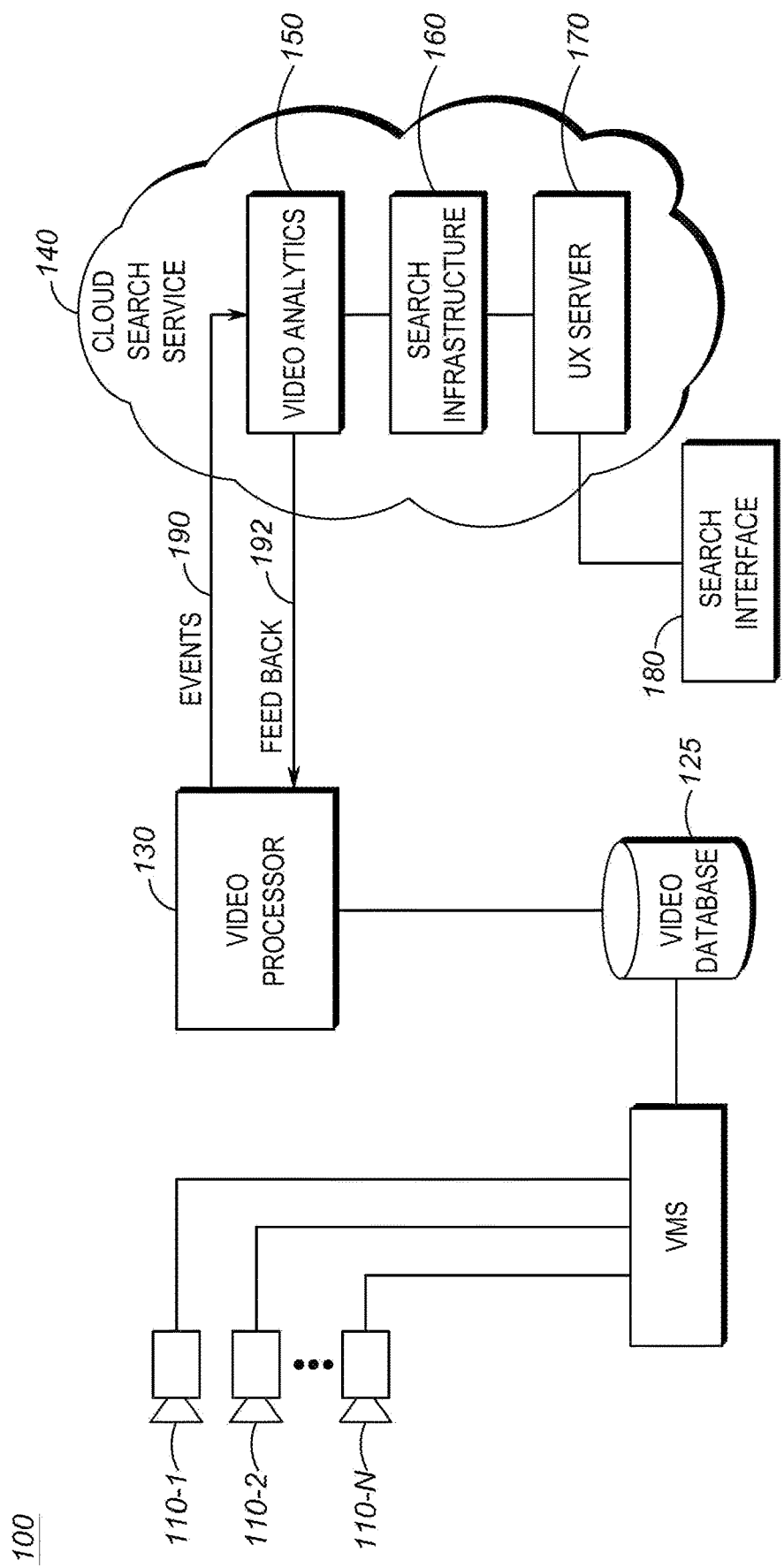
FIG. 1 is an example of an environment in which the techniques described herein may be implemented.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

The system architecture described above is workable, assuming that there is a video stream from the camera (optionally through a VMS system) that can be sent to the cloud video analytics system. However, a problem arises when there is not a video stream that can be sent to the cloud analytics system. For example, the cameras themselves, in order to reduce costs, may not include the ability to stream video directly to the cloud. Such cameras may only be configured to send video to a local VMS where the video is captured as a file. These files may become quite large. Sending such a file to the cloud analytics system (e.g. 72 hour video file) can be very time consuming.

In some cases, the operator of the video security system may be bandwidth constrained (e.g. bandwidth is unavailable, too expensive, etc.) and as such is unable to stream video from the cameras or VMS directly to the cloud analytics system. In some cases, the video security system provider may simply not wish to stream the video to the cloud analytics provider for any number of reasons, including security reasons. Regardless of the reason why, it should be understood that a video stream from a camera may not be available at the cloud analytics system.

Thus, there exists a need for an improved technical method, device, and system for reducing resources used for uploading a video to be indexed for searching to a video analytics system. The techniques described herein solve this problem by providing a video processor on premise application to address the problem that a video stream is not available at the cloud video analytics system. The on premise video processor does not actually upload video to the cloud video analytics system. Instead, the video processor processes the files retrieved from the local VMS system to detect events of interest. Video frames associated with the events of interest may then be sent to the cloud video analytics system to have analytics performed on those frames. In some cases, the frames of interest may be sent using fewer resources. For example, the frames of interest may have been captured at a higher resolution, but in order to preserve bandwidth, are sent to the cloud analytics system at a lower resolution. As another example, the time between frames may be extended, reducing the number of frames that are sent.

The cloud video analytics system may then perform video analytics on those frames. The analytics may be used to extract features in the frames (e.g. object detection, facet detection, etc.). Those features may then be stored in a database and indexed for future searching. In addition, the cloud video analytics may provide feedback to the video process to adjust how events are detected and the quality of the frames that are sent. For example, if the video processor is capturing events (e.g. frames, etc.) at a high rate (e.g. 1 frame every 500 ms) and the cloud video analytics system does not require such a high rate, the video processor may be instructed to reduce the rate at which frames are sent to decrease the bandwidth used.

As another example, the video processor may send frames at a lower resolution than was originally captured to preserve bandwidth. However, the lower resolution may be too low to allow the cloud video analytics to operate properly. For example, a confidence level of an analytic score that is generated may be too low. The cloud video analytics system may provide feedback to the video processor indicating that the frames should be sent at a higher resolution. It should further be noted that because the video processor is operating on a stored file (e.g. not a stream, etc.) it is possible to go "back in time" and resend the frames to the cloud video analytics system. For example, the cloud video analytics system could request that the video processor reprocess the previous 10 minutes of video to detect events, and resend frames of associated with those events to the cloud video analytics system with different parameters (e.g. resolution, etc.).

It should be noted that the video processor does not perform any type of advanced video analytics on the video. Instead, the video processor detects events. For example, the event could be a motion event meaning that some element in the frame has moved. The video processor does not determine what moved or where in the frame the movement occurred. The video processor simply detects that there was some type of change between frames and determines an event occurred. Frames associated with the event are then sent to the cloud video analytics system for further processing. Although the motion is one criteria for even detection, it should be understood that the techniques described herein are not so limited. Other events could include changes from day/night, weather conditions, or other types of sensors. For example, sound sensors may be used to detect sounds such as gunshots. Detection of such a sound could be an event.

A method to reduce resources used for uploading a video to be indexed for searching at a cloud search service is provided. The method includes receiving a file containing the video at an on premise client application. The method further includes processing, by the on premise client application, the file with an event detector to detect at least one event of interest, wherein the at least one event of interest includes at least one of a video frame, a video metadata, and a portion of the file, wherein the event detector detects the event of interest based on a first set of event detection criteria. The method further includes sending, by the on premise client application, the at least one event of interest to the cloud searching service. The method further includes classifying, by the cloud searching service, at least one object in the at least one event of interest. The method further includes identifying, by the cloud searching service, a second set of event identification criteria based on the classification of the at least one object. The method further includes sending, from the cloud searching service to the on premise application, feedback for event detection and sending events, the feedback based on the second set of event identifying criteria. The method further includes modifying, by the on premise application, the first event detection criteria based on the feedback to create new event detection criteria.

In one aspect, the method further includes instructing, by the cloud searching service, the event detector of the on premise client application to re-process at least a portion of the file that has already been processed using the new event detection criteria.

A system to reduce resources used for uploading a video to be indexed for searching at a cloud search service is provided. The system comprises a processor and a memory coupled to the processor. The memory containing a set of instructions thereon that when executed by the processor cause the processor to receive a file containing the video at an on premise client application. The memory further comprises instructions that cause the processor to process, by the on premise client application, the file with an event detector to detect at least one event of interest, wherein the at least one event of interest includes at least one of a video frame, a video metadata, and a portion of the file, wherein the event detector detects the event of interest based on a first set of event detection criteria. The memory further comprises instructions that cause the processor to send, by the on premise client application, the at least one event of interest to the cloud searching service. The memory further comprises instructions that cause the processor to classify, by the cloud searching service, at least one object in the at least one event of interest. The memory further comprises instructions that cause the processor to identify, by the cloud searching service, a second set of event identification criteria based on the classification of the at least one object. The memory further comprises instructions that cause the processor to send, from the cloud searching service to the on premise application, feedback for event detection and sending events, the feedback based on the second set of event identifying criteria. The memory further comprises instructions that cause the processor to modify, by the on premise application, the first event detection criteria based on the feedback to create new event detection criteria.

In one aspect, the memory further comprises instructions that cause the processor to instruct, by the cloud searching service, the event detector of the on premise client application to re-process at least a portion of the file that has already been processed using the new event detection criteria.

A non-transitory processor readable medium to reduce resources used for uploading a video to be indexed for searching at a cloud search service comprising a set of instructions is provided. The instructions, that when executed by a processor cause the processor to receive a file containing the video at an on premise client application. The instructions further cause the processor to process, by the on premise client application, the file with an event detector to detect at least one event of interest, wherein the at least one event of interest includes at least one of a video frame, a video metadata, and a portion of the file, wherein the event detector detects the event of interest based on a first set of event detection criteria. The instructions further cause the processor to send, by the on premise client application, the at least one event of interest to the cloud searching service. The instructions further cause the processor to classify, by the cloud searching service, at least one object in the at least one event of interest. The instructions further cause the processor to identify, by the cloud searching service, a second set of event identification criteria based on the classification of the at least one object. The instructions further cause the processor to send, from the cloud searching service to the on premise application, feedback for event detection and sending events, the feedback based on the second set of event identifying criteria. The instructions further cause the processor to modify, by the on premise application, the first event detection criteria based on the feedback to create new event detection criteria.

In one aspect, the instructions further cause the processor to instruct, by the cloud searching service, the event detector of the on premise client application to re-process at least a portion of the file that has already been processed using the new event detection criteria.

In one aspect, the event detection criteria includes at least one of motion detection and proximity detection. In one aspect, the feedback includes adjusting an event, the adjusting including at least one of changing a frame resolution, a frame separation time, and a compression method. In one aspect, changing the frame resolution rate comprises changing the frame resolution rate for only a portion of the frame. In one aspect, the feedback includes at least one of adding and removing content from the at least one event of interest. In one aspect, the feedback includes at least one of adding and removing a telemetry track from the at least one event of interest.

Further advantages and features consistent with this disclosure will be set forth in the following detailed description, with reference to the figures.

FIG. 1 is an example of an environment 100 in which the techniques described herein may be implemented. Environment 100 may include a plurality of cameras 110-1 . . . n, a video management system 120, a video database 125, an on premise video processor application 130. Environment 100 may include a cloud search service 140 which includes a video analytics system 150, search infrastructure 160, a user experience system 170, and a search interface 180.

Cameras 110 may be of any type that are suitable for use in video security systems. The cameras may include traditional visible light cameras, infrared cameras, millimeter wavelength radar cameras, multi sensor cameras, or any other type of camera capable of capturing a field of view. The cameras may further be capable of capturing audio. In some cases, the cameras, or sensors associated with the camera may be able to record telemetry information (e.g. temperature, cameras current pan-tilt-zoom (PTZ) settings, camera orientation, camera geolocation, etc.).

Environment 100 may also include a VMS 120. VMS 12 may be coupled to cameras 110. The VMS system may be coupled to the cameras via wired or wireless connection. For example, the cameras and the VMS may be coupled via a wired or wireless local area network (e.g. Ethernet, WiFi, etc.). The VMS may be used to receive the video and telemetry data from the cameras. The VMS may also be associated with a video database 125 which store the information received from the cameras.

VMS 120 may be utilized by an operator to configure cameras 110. For example, an operator may use the VMS to control the PTZ functions of a camera to redirect the field of view of that camera. The VMS system might also provide a user interface where information stored in the video database 125 can be retrieved and viewed. For example, the VMS might provide a video playback application through which video captured by the cameras can be viewed. What should be understood is that in example environment 100, none of the cameras, the VMS, or the video database provides a streaming connection through which video could be sent to a cloud video analytics system.

Environment 100 also includes an on premise video processor application 130, which may be referred to as an on premise application. In many cases, the on premise video processor may be an application deployed on a device such as a desktop or lap top computer. However, in other implementations, the functionality of the on premise application may be integrated with the VMS 120. What should be understood is that the on premise video processor takes in a video file, and as will be described in further detail below, processes the video file to send certain portions of the video file to a cloud search service as events.

Environment 100 also includes a cloud search service 140. The cloud search serve may receive events from the video processor 130 and perform video analytics on those events. The cloud search service may include a video analytics system 150. The video analytics system may process events received from the video processor to, among other things, identify and classify objects within those events. This may include extracting features and facets from those events. In addition, the video analytics system may provide feedback to the video processor to alter the criteria used for event detection.

Cloud search service 140 may also include search infrastructure 160. Search infrastructure 160 may receive metadata regarding events (e.g. objects identified, characteristics of those identified objects, etc.) from video analytics system 150. The search infrastructure may take that metadata, index it, and store it in searchable databases included as part of the search infrastructure.

User experience server 170 may provide a service where a user can query the search infrastructure 160 to returns results. For example, user experience infrastructure may provide a search interface 180 which allows a user to search on the metadata stored in the search infrastructure (e.g. search for a person in a red top and blue pants, etc.). The user experience server may take a request from the search interface and access the search infrastructure to obtain results. Those results may then be provided through the search interface.

In operation, cameras 110 may capture video from their respective field of views. Those cameras may also capture other types of information, such as audio and other types of telemetry. All of the information captured may then be sent to VMS 120 to eventually be stored as a file in video database 125. The VMS may be used to control the cameras, change their position, alter what telemetry information is sent, etc. In other words, the VMS may control operation of the cameras. It should be understood that this process may occur continuously, without any connection to the cloud search service 140 or on premise video processor 130.

At some point, an operator may wish to process the video captured by the cameras 110 so that it is searchable via a cloud search service 140. As noted above, there is no streaming connection between the VMS 120 and the cloud search service. The operator may then connect the on premise video processing application 130 to the VMS. The on premise video processor application may take the form of an application running on a laptop or desktop computer. In some cases, the on premise video processor application may run on the same hardware as the VMS, but acts as a standalone application. What should be understood is that the on premise video application does have a connection to the cloud search service.

The on premise video processor application 130 may retrieve a video file from the video database 125 and process the file. Processing the file may include detection of events in the file. Events may include things such as detection of motion or detection of proximity (e.g. movement across a defined threshold, etc.). What should be understood is that the video processor application is detecting events based on defined criteria and is not performing any type of object detection or any other types of advanced analytics on the file retrieved from the video database.

Upon detection of an event, the video processor application 130 may send that event 190 to the video analytics system 150 of the cloud search service 140. The event sent to the video analytics system may include at least two frames that are associated with the event. What should be noted is that by only including a limited number of video frames with the event, the amount of bandwidth need is significantly less than if the entire video was streamed. Furthermore, additional modifications can be made to the video frames sent with the event. For example, the cameras 110 may capture the video at a given resolution and store the video in the video database 125 at the capture resolution. The video processor application may then convert the video frames from the original resolution to a lower resolution prior to sending to reduce the amount of bandwidth needed. It should be understood that changing resolution is simply an example and that the techniques described herein are not so limited. Other examples could include changing a codec, color depth, compression, removal of metadata, etc. What should be understood is that the images included in the event sent to the video analytics system is not necessarily the same as the images as initially captured.

Upon receipt of the event 190 by the video analytics system 150, video analytics may be attempted on the received frames. The video analytics may include object detection, object classification, feature extraction, etc. As one example, video analytics may detect an object in the video frame and then classify that object as a human. Once identified as a human, video analytics related to a human may be run to extract features (e.g. metadata) associated with a human (e.g. color shirt, color pants, hair color, facial recognition, etc.). As another example, the video analytics may detect an object and classify the object as an automobile. Automobile related video analytics may be run to extract automobile specific features (e.g. make, model, color, etc.).

As mentioned above, and as will be described in further detail below, the video processor application 130 may detect events and send those events, as well as video frames associated with the events, to the video analytics system 150 in a format that reduces bandwidth usage. In some cases, these alterations may cause the video analytics system to be unable to accurately perform video analytics. As such, the video analytics system may send feedback 192 to the video processor application to alter how events are reported (e.g. do not reduce resolution, decrease inter-frame time, etc.). The video processor application may then begin to immediately use the criteria specified in the feedback 192. Furthermore, because the video processor application is operating on a file, as opposed to a live video stream, the video processor application may reprocess some or all of the file from an earlier point in time, resulting in the ability to effectively go back in time when processing the video.

Once the video analytics system 150 has extracted the metadata from the events (e.g. detecting humans and vehicles, extracting clothing colors, vehicle attributes, etc.) all of the metadata may be stored and indexed in search infrastructure 160. The techniques described herein are not dependent on any particular type of search infrastructure. Any currently available or later developed search infrastructure would be suitable for use with the techniques described herein.

A user (not shown) may wish to query the search infrastructure 160. For example, the user may wish to search for all video including a person wearing a red shirt and blue pants. The cloud search service 140 may include a user experience server 170 that provides a search interface 180 through which users can query the search infrastructure 160 and receive responses.

Figure 2:
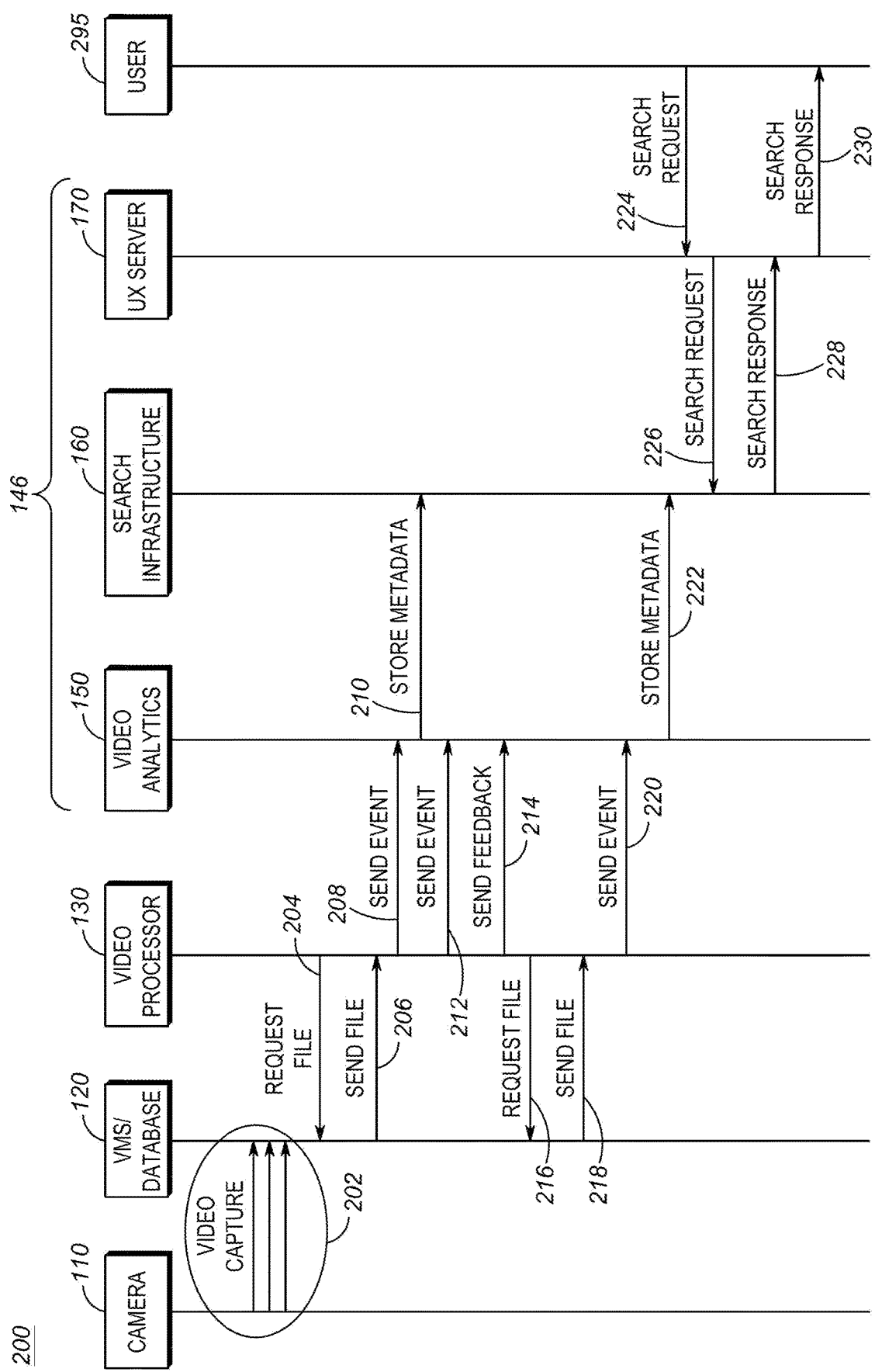
FIG. 2 is an example of a message sequence chart describing communication between entities according to the techniques described herein.

FIG. 2 is an example of a message sequence chart 200 describing communication between entities according to the techniques described herein. Message sequence chart 200 includes entities similar to those described with respect to FIG. 1 and are numbered with corresponding references numerals. For ease of description, the video database 125 is depicted as being integrated with the VMS 120 in FIG. 2. However, it should be understood that the entities depicted in FIG. 2 are the same as those described with respect to FIG. 1. Furthermore, although FIG. 2 is described with reference to a single camera, it should be understood that this is for ease of description only, and not by way of limitation.

Camera 110 may continuously capture 202 video/audio/telemetry data, etc. and send such captured information to the VMS/Database 120 to be stored. It should be understood that this storage process may occur independently of the additional processing of the data as will be described in further detail below. In other words, the camera may always be storing data into the VMS even if that data is never processed according to the techniques described herein. As explained above, the camera is connected to the VMS and has no ability to send the captured data any place other than the VMS system.

At some point, a user may decide that video captured by the camera 110 should be processed by a cloud search service 140 for indexing for later searching. For example, the user may determine that there was some incident captured during a time period (e.g. sometime in the last two days) wherein the video should be processed by the video analytics system. The user may utilize an on premise video processor application 130 to begin the process. The user may cause the on premise video processor application to request the file 204 associated with the defined time period from the VMS 120. The VMS may then respond by sending the requested file 206 to the on premise video processor application.

The on premise video processor application may then begin to process the received video file to detect events. Although the file is described as a video file, it should be understood that the file may include information in addition to the actual video (e.g. audio, sensor telemetry, etc.). Event detection can include detection of changes in the video scene that do not require large amounts of processing. For example, detecting movement in a scene can be done by comparing two frames in the video. If there is any difference in the frames, this may indicate a movement event has occurred.

As yet another example, event detection may include proximity detection. For example, changes in video frames in relation to fixed positions in the video frame may indicate that something is occurring within proximity to a defined area. What should be understood is that the on premise video processor application is not performing sophisticated video analytics, such as object detection, object classification, facet extraction, etc. on the video file. Instead, the on premise video processor is simply performing low level event detection that determines that something may be occurring, without any attempt to determine what is occurring. What should be understood is that event detection includes detecting changes between a current frame and a reference frame.

There are many different techniques that may be used to detect such changes. For example, frame differencing detects changes between different image frames. Background subtraction may create a model of the background and subtract it from the image to detect events in the foreground. Noise reduction may use blurring to improve accuracy of motion detection. Contour detection may detect boundaries between regions of the image frame. It should be understood that the techniques described herein are usable with any currently existing or later developed detection techniques.

Upon detection of an event, the on premise video processor application 130 may send the event 208 to a video analytics system 150 that is part of a cloud search service 140. Prior to sending the event, the on premise video processor may modify the event in order to conserve bandwidth or other resources. For example, an event may initially include two image frames (i.e. motion detected by identifying difference between the frames) with a certain initial frame separation (e.g. 2000 milliseconds). The image frames may have been captured at an initial resolution, but in order to reduce bandwidth usage, the on premise video processor application may reduce the resolution by scaling or some other technique. In addition, the events may include image data, such as codec used, bitrate, color depth, and other image parameters. This image data may be removed to conserve bandwidth.

In addition, the on premise video processor application may generate metadata. For example, the position of the event within the overall video (e.g. timestamp of the event), an event ID identifying the event, a customer ID for cases where multiple customer use the same cloud search service, sensor time, location, etc. In some cases, portions of the actual video (e.g. more than two frames) may also be collected, in whole or part, compressed or uncompressed. All of the data related to the event may be bundled together and sent 208 to the cloud search service 140.

A video analytics system 150 of the cloud search service 140 may then perform video analytics on the received event. The video analytics may include object detection to determine the objects included in the video frames contained within the event. For example, the object detection may include detecting an object in the frame by identifying the object with a bounding box. Secondary analytics may include classifying the object to determine what it is (e.g. human, automobile, etc.). Once the type of object is determined, analytics related to the object type may be run to extract facets of the object. For example, if a human is detected, analytics may be run to determine the color of clothing the person is wearing. For an automobile, an analytic can be run to determine the make, model, and color of the automobile. What should be understood is that analytics can be run to identify objects and characteristics of those objects.

In addition, analytics may be run to identify actions contained within the event. For example, if a detected object is a human, some actions that might be detected include walking, running, driving, etc. What should be understood is that based on the object, different types of actions may be identified. Video analytics may also be run to identify relationships between objects in the events. For example, analytics may be run to determine if two objects are next to each other, inside the other (e.g. human inside automobile, etc.), beside each other, etc. Video analytics may also be run to identify position based data. For example, a current location of the object, speed of the object, direction of travel, etc.

Although several types of video analytics have been described, it should be understood that the techniques described herein are not limited to those specific analytics. The techniques described herein are suitable for use with any video analytic techniques currently available or developed in the future. What should be understood is that all of the information extracted from the event by the video analytics processing may be referred to as metadata. The metadata may then be stored 210 in the search infrastructure 160. The search infrastructure may index the metadata and make it searchable by a user. The techniques described herein are not dependent on any particular type of search infrastructure. Any currently existing or future developed search infrastructure that allows searching of indexed metadata would be usable with the techniques described herein.

In the description thus far, it has been assumed that the video analytics system 150 is able to extract the metadata from the events without issue. This may not always be the case. As explained above, the on premise video processor application 130 may attempt to conserve bandwidth by altering the quality and/or content that is included in the event sent to the video analytics system. In some cases, the alteration may be such that the video analytics system is unable to extract the metadata from the event or the confidence level of the result generated by the video analytic does not meet a minimum threshold. For example, the on premise video processor may send an event with image frames of such low resolution that the object detector of the video analytics system cannot detect any object, even though there may be objects in the scene.

In cases where the data included in the event is insufficient/unusable by the video analytics system 140 to extract metadata, the video analytics system may send feedback 214 to the on premise video processor application 130 to alter the data being sent by the event detector. Some examples of modifying the on premise video processor event selection and processing are described below.

Initially, one possible feedback is for the on premise video processor application 140 to reprocess the video file. This may request that the entire file be reprocessed or that the file be reprocessed at a particular time index or event ID. In some implementations, this may cause the on premise video processor application to request the file 216 again and for the VMS 120 to send the file 218 again. Although it should be understood that in other implementations, the on premise video processor application may keep a local copy of the file and need not request a new copy.

The feedback may also instruct the on premise video processor application to adjust the event by altering the frame count (e.g. increase or decrease) if the video analytics system 150 requires each event to include more or less frames. The feedback may instruct the on premise video processor application to increase event frame resolution (e.g. if the resolution was reduced to decrease bandwidth usage). The feedback may instruct the on premise video processor application to change the compression method used for sending the images if the current compression method is preventing proper operation of the video analytics system. The feedback may instruct the on premise video processor application to change the amount of compression that is used.

The feedback may instruct the on premise video processor application to alter the contrast in the images to aid the video analytics system in extracting metadata. The feedback may instruct the on premise video processor application to alter the color depth for the same reason. The feedback may instruct the on premise video processor application to modify the frame separation time (e.g. increase or decrease from the 2000 millisecond initial frame separation time). The feedback may instruct the on premise video processor application to modify the location accuracy of the frames in the event.

The feedback may instruct the on premise video processor application to add or remove content from the event. For example to add or remove the audio from the video file, add or remove metadata provided by the video file, etc. In some cases, the feedback may instruct the on premise video processor application to increase the resolution of an image for only a portion of the image (e.g. the portion identified by a bounding box). The feedback may instruct the on premise video processor application to add or remove a telemetry track (e.g. sensor/camera location/orientation, PTZ, etc.) or add or remove an audio track to help identify objects.

Regardless of the changes requested by the feedback, what should be understood is that the video analytics system 150 instructs the on premise video processor application to adjust the data sent in an event in such a way to improve the accuracy of the video analytics system. Thus, if the parameters selected by the event detection system to reduce bandwidth usage are such that it is preventing the video analytics system for extracting metadata, the feedback alters the event detection system to provide event data that is usable for metadata extraction.

Once the feedback has been received by the on premise video processor system 130, events detected based on the feedback (either new events or events from reprocessing the video file) may be sent 220 to the video analytics system 150. Just as above, the video analytics system may extract metadata from the event and store that metadata 222 in the search infrastructure 160.

At some point in time, a user 295 may wish to query the search infrastructure 160 to locate an event of interest. For example, the user may wish to find all instances of a person in a red shirt standing next to a blue car. The user experience server 170 may provide a search interface to allow the user to make such a query 224 of the search infrastructure. Upon receiving such a query 226, the search infrastructure may search the indexed metadata to identify any events including the search criteria. The search response 228 may include time stamps of particular videos that include the specified search criteria. The search response may be sent 230 to the user.

Figure 3:
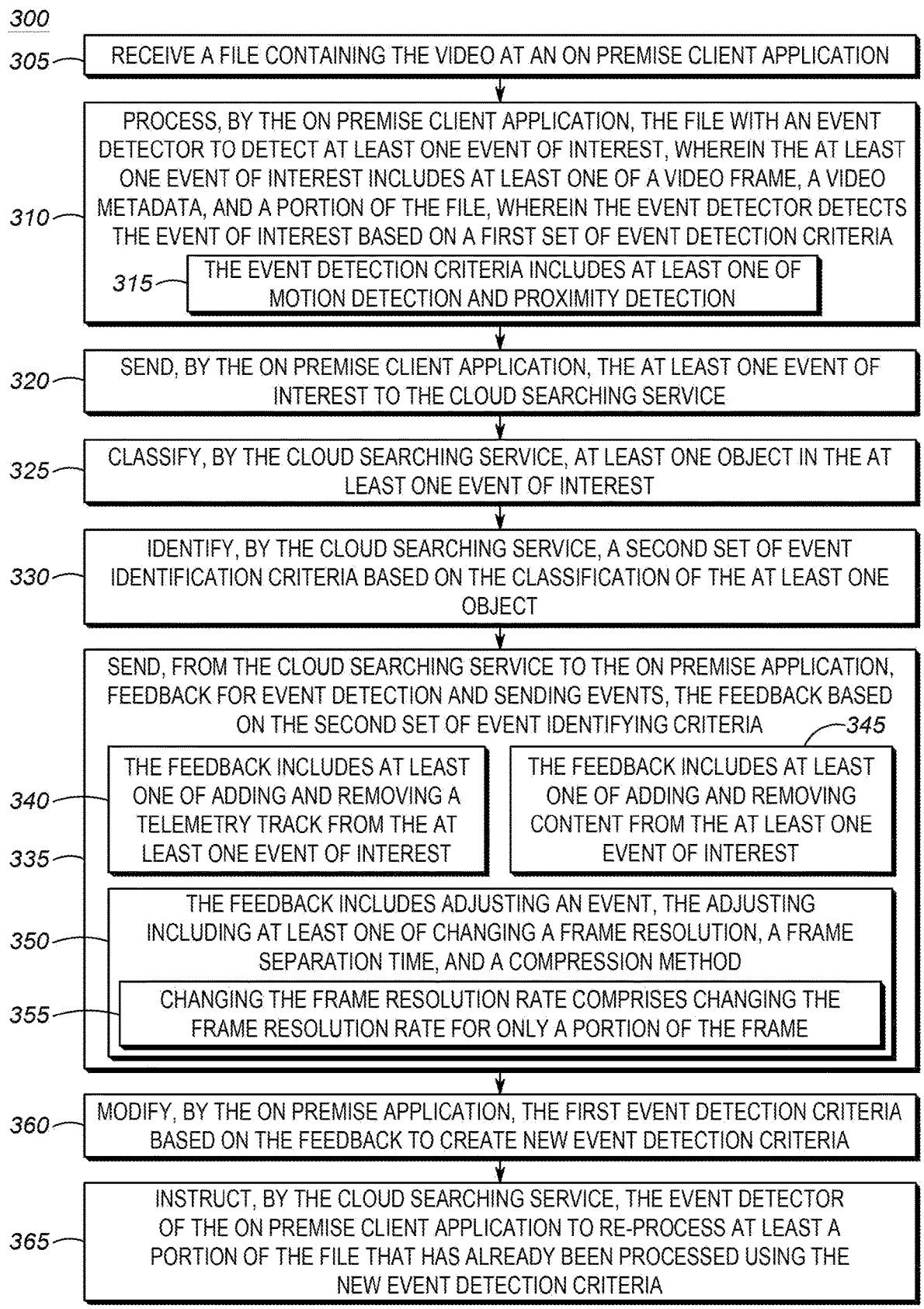
FIG. 3 is an example of a flow chart of an implementation of the techniques described herein.

FIG. 3 is an example of a flow chart 300 of an implementation of the techniques described herein. In block 305, a file containing the video may be received at an on premise client application. As described above the on premise client application may receive the video file from a VMS system or a database storing video. The particular source of the file is unimportant. What should be understood is that the video file is received from a source that either cannot or is configured to not send or stream the file directly to a cloud search service.

In block 310, the on premise client application processes the file with an event detector to detect at least one event of interest, wherein the at least one event of interest includes at least one of a video frame, a video metadata, and a portion of the file, wherein the event detector detects the event of interest based on a first set of event detection criteria. The on premise application scans the file looking for events that meet the event detection criteria. As shown in block 315, such criteria may include motion, proximity, or any other type of event detection criteria that does not require advanced analytics to identify. For example, the event detection criteria are not capable of extracting object data (e.g. object detection, object classification, etc.) from the video.

In block 320, the on premise client application sends the at least one event of interest to the cloud searching service. The event of interest includes at least two image frames. The event of interest sent to the cloud searching service may also include other metadata as described above, including timestamps, audio data, telemetry data, etc.

In block 325, the cloud searching service classifies at least one object in the at least one event of interest. In other words, the cloud searching service may run object detection analytics on the event received from the on premise application to identify objects of interest (e.g. humans, vehicles, etc.) included in the event. In block 330, the cloud searching service identifies, a second set of event identification criteria based on the classification of the at least one object. For example, if the object is not able to be identified based on the information sent in the event, the cloud searching service may identify criteria that may be modified by the on premise application to improve operation of the cloud searching service.

In block 335, the cloud searching service sends to the on premise application feedback for event detection and sending events, the feedback based on the second set of event identifying criteria. In other words, the cloud searching service identifies criteria that would aid in the operation of identifying objects and provides feedback to the on premise application to alter the event detection process based on the feedback.

Block 340 depicts one type of feedback that includes at least one of adding and removing a telemetry track from the at least one event of interest. As described above, a telemetry track may include non video information such as location and PTZ information. The feedback may indicate that adding or removing such information may improve the operation of the video analytics system. Block 345 depicts another example of feedback includes at least one of adding and removing content from the at least one event of interest. For example, the content may include an audio track if the audio is helpful/unhelpful in identifying objects within the event.

Block 350 depicts yet another type of feedback wherein the feedback includes adjusting an event, the adjusting including at least one of changing a frame resolution, a frame separation time, and a compression method. Yet another example could include changing a compression amount. As explained above, such parameters may significantly impact the ability of video analytics to identify objects within events. Setting such parameters too high may unnecessarily use bandwidth while setting them too low may cause object detection video analytics to fail. The feedback may allow the correct amount of bandwidth to accurately identify objects to be used without being wasteful of bandwidth. In block 355, changing the frame resolution rate comprises changing the frame resolution rate for only a portion of the frame. For example, if an object is detected in a frame, but the resolution is too low to classify the object (e.g. as human, vehicle, etc.) the feedback may include providing only the portion of the frame including the object (e.g. within a bounding box) at a higher resolution.

In block 360, the on premise application modifies the event detection criteria based on the feedback to create new event detection criteria. The new event detection criteria defines the criteria for event detection and for what is sent in the event to the cloud searching service (e.g. resolution, frame rate, etc.).

In block 365, the cloud searching service instructs the event detector of the on premise client application to re-process at least a portion of the file that has already been processed using the new event detection criteria. For example, if a portion of the file was processed using the first event detection criteria, when new event detection criteria is received, the on premise application may be instructed to re-process that portion using the new event detection criteria. This can be done because it is a file being processed, not a stream which may disappear once sent. As such, this provides the ability to effective look back in time by rewinding the file to an earlier point in time.

Figure 4:
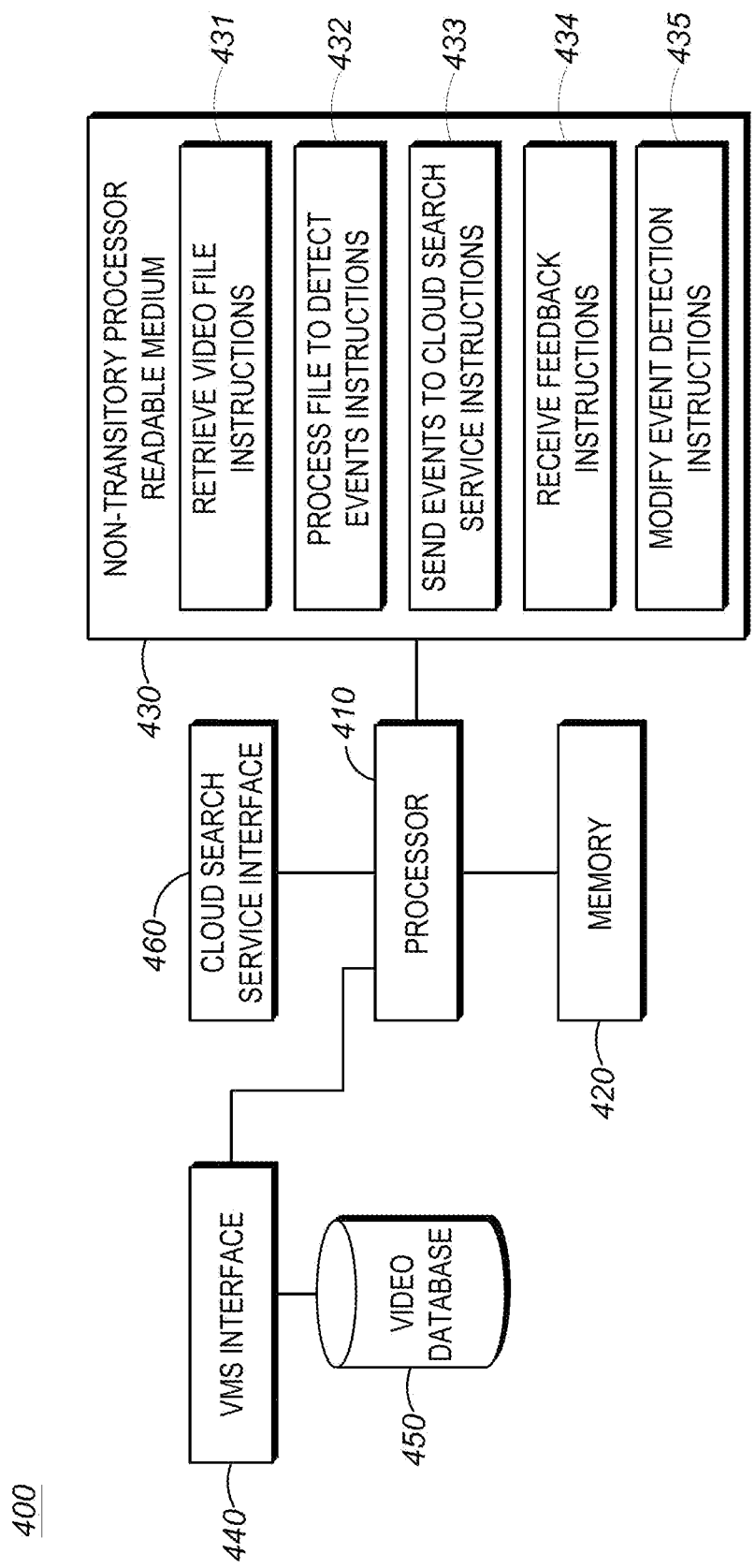
FIG. 4 is an example of a device that may implement the on premise video processing techniques described herein.

FIG. 4 is an example of a device 400 that may implement the on premise video processor application described herein. It should be understood that FIG. 4 represents one example implementation of a computing device that utilizes the techniques described herein. Although only a single processor is shown, it would be readily understood that a person of skill in the art would recognize that distributed implementations are also possible. For example, the various pieces of functionality described above (e.g. event detection, criteria modification, etc.) could be implemented on multiple devices that are communicatively coupled. FIG. 4 is not intended to imply that all the functionality described above must be implemented on a single device.

Device 400 may include processor 410, memory 420, non-transitory processor readable medium 430, VMS interface 440, video database 450, and cloud search service interface 460.

Processor 410 may be coupled to memory 420. Memory 420 may store a set of instructions that when executed by processor 410 cause processor 410 to implement the techniques described herein. Processor 410 may cause memory 420 to load a set of processor executable instructions from non-transitory processor readable medium 430. Non-transitory processor readable medium 430 may contain a set of instructions thereon that when executed by processor 410 cause the processor to implement the various techniques described herein.

For example, medium 430 may include retrieve video file instructions 431. The retrieve video file instructions 431 may cause the processor to utilize the VMS interface 440 to retrieve a video file stored in a video database 450 associated with the VMS system. The retrieve video file instructions 431 are described throughout this description generally, including places such as the description of block 305.

The medium 430 may include process file to detect events instructions 532. The process file to detect events instructions 532 may cause the processor to to through the retrieve video file to detect events of interest. The process file to detect events instructions 532 are described throughout this description generally, including places such as the description of blocks 310 and 315.

The medium 430 may include send events to cloud search service instructions 433. The send events to cloud search service instructions 433 may cause the processor to utilize the cloud search service interface 460 to send the events to the cloud search service for video analytics processing. The send events to cloud search service instructions 433 are described throughout this description generally, including places such as the description of block 320.

The medium 430 may include receive feedback instructions 434. The receive feedback instructions 434 may cause the processor to receive feedback from the cloud search service via the cloud search service interface 460. The receive feedback instructions 434 are described throughout this description generally, including places such as the description of block 335.

The medium 430 may include modify event detection instructions 435. The modify event detection instructions 435 may cause the processor to modify the event detection criteria used by the on premise application based on the feedback. The feedback may also cause the processor to reprocess at least a portion of the video file using the new event detection criteria. The modify event detection instructions 435 are described throughout this description generally, including places such as the description of blocks 360 and 365.

Figure 5:
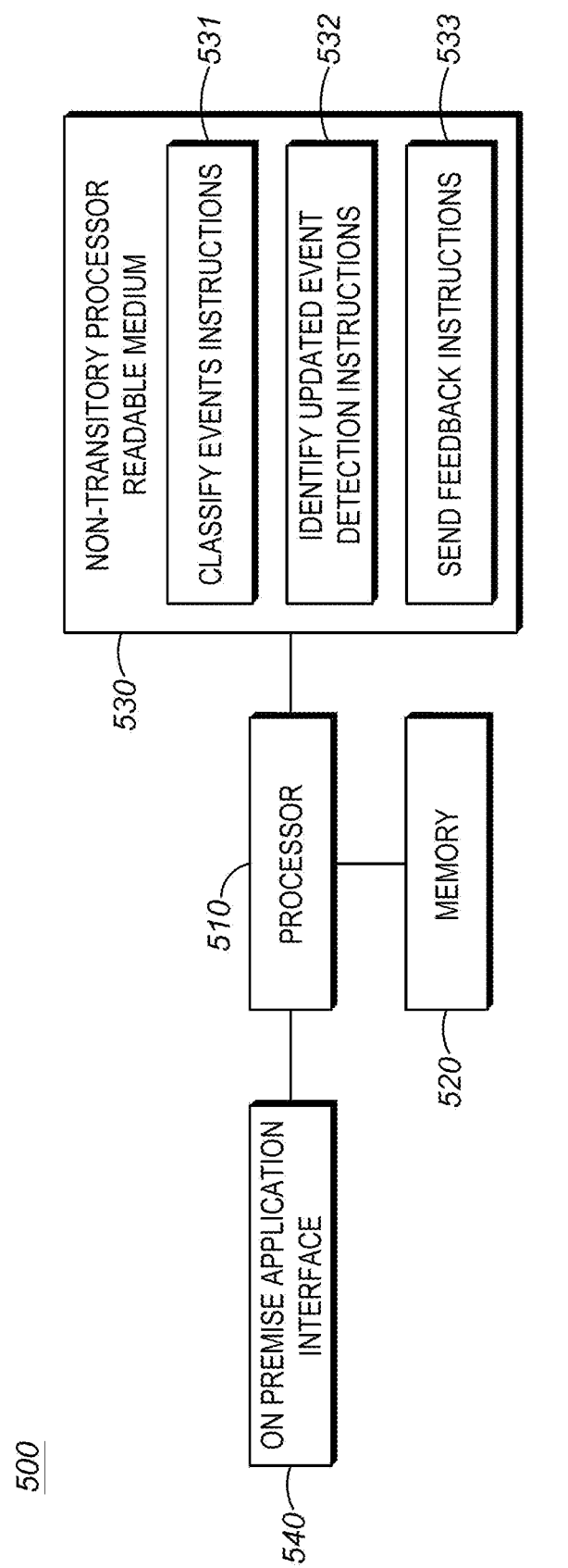
FIG. 5 is an example of a device that may implement the cloud search service techniques described herein.

FIG. 5 is an example of a device 500 that may implement the cloud search service techniques described herein. It should be understood that FIG. 5 represents one example implementation of a computing device that utilizes the techniques described herein. Although only a single processor is shown, it would be readily understood that a person of skill in the art would recognize that distributed implementations are also possible. For example, the various pieces of functionality described above (e.g. video analytics, feedback generation, etc.) could be implemented on multiple devices that are communicatively coupled. FIG. 5 is not intended to imply that all the functionality described above must be implemented on a single device.

Device 500 may include processor 510, memory 520, non-transitory processor readable medium 530, and on premise application 540.

Processor 510 may be coupled to memory 520. Memory 520 may store a set of instructions that when executed by processor 510 cause processor 510 to implement the techniques described herein. Processor 510 may cause memory 520 to load a set of processor executable instructions from non-transitory processor readable medium 530. Non-transitory processor readable medium 530 may contain a set of instructions thereon that when executed by processor 510 cause the processor to implement the various techniques described herein.

For example, medium 530 may include classify events instructions 531. The classify events instructions 531 may cause the processor to receive events from the on premise application via the on premise application interface 540. The classify events instructions 531 may cause the processor to perform video analytics on the events and store the metadata extracted in a system that is searchable. The classify events instructions 531 are described throughout this description generally, including places such as the description of block 325.

The medium 530 may include identify updated event detection instructions 532. The identify updated event detection instructions 532 may cause the processor to determine that video analytics operation may be improved if the event detection criteria on the on premise application was changed. The identify updated event detection instructions 532 are described throughout this description generally, including places such as the description of block 330 and blocks 340-355.

The medium 530 may include send feedback instructions 533. The send feedback instructions 533 may cause the processor to send the updated event detection criteria to the on premise application via the on premise application interface 540. The send feedback instructions 533 are described throughout this description generally, including places such as the description of block 335.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot process a video file to detect events of interest and send images associated with those events to a cloud searching system, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

Also, it should be understood that the illustrated components, unless explicitly described to the contrary, may be combined or divided into separate software, firmware, and/or hardware. For example, instead of being located within and performed by a single electronic processor, logic and processing described herein may be distributed among multiple electronic processors. Similarly, one or more memory modules and communication channels or networks may be used even if embodiments described or illustrated herein have a single such device or element. Also, regardless of how they are combined or divided, hardware and software components may be located on the same computing device or may be distributed among multiple different devices. Accordingly, in this description and in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computer-implemented method to reduce resources used for uploading a video to be indexed for searching at a cloud search service comprising:
    receiving a file containing the video at an on premise client application;
    processing, by the on premise client application, the file with an event detector configured to detect at least one event of interest in the file based on a first set of event detection criteria, wherein the at least one event of interest includes at least one of a video frame, a video metadata, and a portion of the file;
    modifying the at least one event of interest to reduce resources used when sending the at least one event of interest;
    sending, by the on premise client application, the at least one event of interest to the cloud searching service;
    performing video analytics, by the cloud searching service, on the at least one event of interest to detect at least one object in the at least one event of interest;
    determining that the video analytics is unable to detect the at least one object of interest with the first event detection criteria;
    identifying a second set of event identification criteria based on the determination that the video analytics is unable to detect the at least one object of interest with the first event detection criteria;
    sending, from the cloud searching service to the on premise application, feedback for event detection and sending events, the feedback based on the second set of event identification criteria; and
    configuring, by the on premise application, the event detector to use new event detection criteria, the new event detection criteria based on the feedback.

2. The computer-implemented method of claim 1 further comprising:
    re-processing, by the on premise client application, at least a portion of the file with the event detector configured with the new event detection criteria.

3. The computer-implemented method of claim 1 wherein the event detection criteria includes at least one of motion detection and proximity detection.

4. The computer-implemented method of claim 1 wherein the new event detection criteria includes at least one of changing a frame resolution, a frame separation time, and a compression method.

5. The computer-implemented method of claim 4 wherein changing the frame resolution rate comprises changing the frame resolution for only a portion of the frame.

6. The computer-implemented method of claim 1 wherein the feedback includes at least one of adding and removing content from the at least one event of interest.

7. The computer-implemented method of claim 1 wherein the feedback includes at least one of adding and removing a telemetry track from the at least one event of interest.

8. A computer-implemented system to reduce resources used for uploading a video to be indexed for searching at a cloud search service comprising:
a processor; and
a memory coupled to the processor, the memory containing a set of instructions thereon that when executed by the processor cause the processor to:
receive a file containing the video at an on premise client application;
process, by the on premise client application, the file with an event detector configured to detect at least one event of interest based on a first set of event detection criteria, wherein the at least one event of interest includes at least one of a video frame, a video metadata, and a portion of the file;
modify the at least one event of interest to reduce resources used when sending the at least one event of interest;
send, by the on premise client application, the at least one event of interest to the cloud searching service;
perform video analytics, by the cloud searching service, on the at least one event of interest to detect at least one object in the at least one event of interest;
determine that the video analytics is unable to detect the at least one object of interest with the first event detection criteria;
identify a second set of event identification criteria based on the determination that the video analytics is unable to detect the at least one object of interest with the first event detection criteria;
send, from the cloud searching service to the on premise application, feedback for event detection and sending events, the feedback based on the second set of event identification criteria; and
configure, by the on premise application, the event detector to use new event detection criteria, the new event detection criteria based on the feedback.

9. The computer-implemented system of claim 8 further comprising instructions to:
re-process, by the on premise client application, at least a portion of the file with the event detector configured with the new event detection criteria.

10. The computer-implemented system of claim 8 wherein the event detection criteria includes at least one of motion detection and proximity detection.

11. The computer-implemented system of claim 8 wherein the new event detection criteria includes at least one of changing a frame resolution, a frame separation time, and a compression method.

12. The computer-implemented system of claim 8 wherein changing the frame resolution rate comprises changing the frame resolution rate for only a portion of the frame.

13. The computer-implemented system of claim 8 wherein the feedback includes at least one of adding and removing content from the at least one event of interest.

14. The computer-implemented system of claim 8 wherein the feedback includes at least one of adding and removing a telemetry track from the at least one event of interest.

15. A non-transitory processor readable medium to reduce resources used for uploading a video to be indexed for searching at a cloud search service comprising a set of instructions that when executed by a processor cause the processor to:
receive a file containing the video at an on premise client application;
process, by the on premise client application, the file with an event detector configured to detect at least one event of interest based on a first set of event detection criteria, wherein the at least one event of interest includes at least one of a video frame, a video metadata, and a portion of the file;
modify the at least one event of interest to reduce resources used when sending the at least one event of interest;
send, by the on premise client application, the at least one event of interest to the cloud searching service;
perform video analytics, by the cloud searching service, on the at least one event of interest to detect at least one object in the at least one event of interest;
determine that the video analytics is unable to detect the at least one object of interest with the first event detection criteria;
identify a second set of event identification criteria based on the determination that the video analytics is unable to detect the at least one object of interest with the first event detection criteria;
send, from the cloud searching service to the on premise application, feedback for event detection and sending events, the feedback based on the second set of event identification criteria; and
configure, by the on premise application, the event detector to use new event detection criteria, the new event detection criteria based on the feedback.

16. The non-transitory processor readable medium of claim 15 further comprising instructions to:
re-process, by the on premise client application, at least a portion of the file with the event detector configured with the new event detection criteria.

17. The non-transitory processor readable medium of claim 15 wherein the event detection criteria includes at least one of motion detection and proximity detection.

18. The non-transitory processor readable medium of claim 15 wherein the new event detection criteria includes at least one of changing a frame resolution, a frame separation time, and a compression method.

19. The non-transitory processor readable medium of claim 15 wherein changing the frame resolution rate comprises changing the frame resolution rate for only a portion of the frame.

20. The non-transitory processor readable medium of claim 15 wherein the feedback includes at least one of adding and removing content from the at least one event of interest.

* * * * *